Sept. 27, 1938. E. S. MERRIAM Re. 20,868
PREFORMED ABRASIVE ARTICLE AND PROCESS OF MAKING SAME
Original Filed Sept. 17, 1935
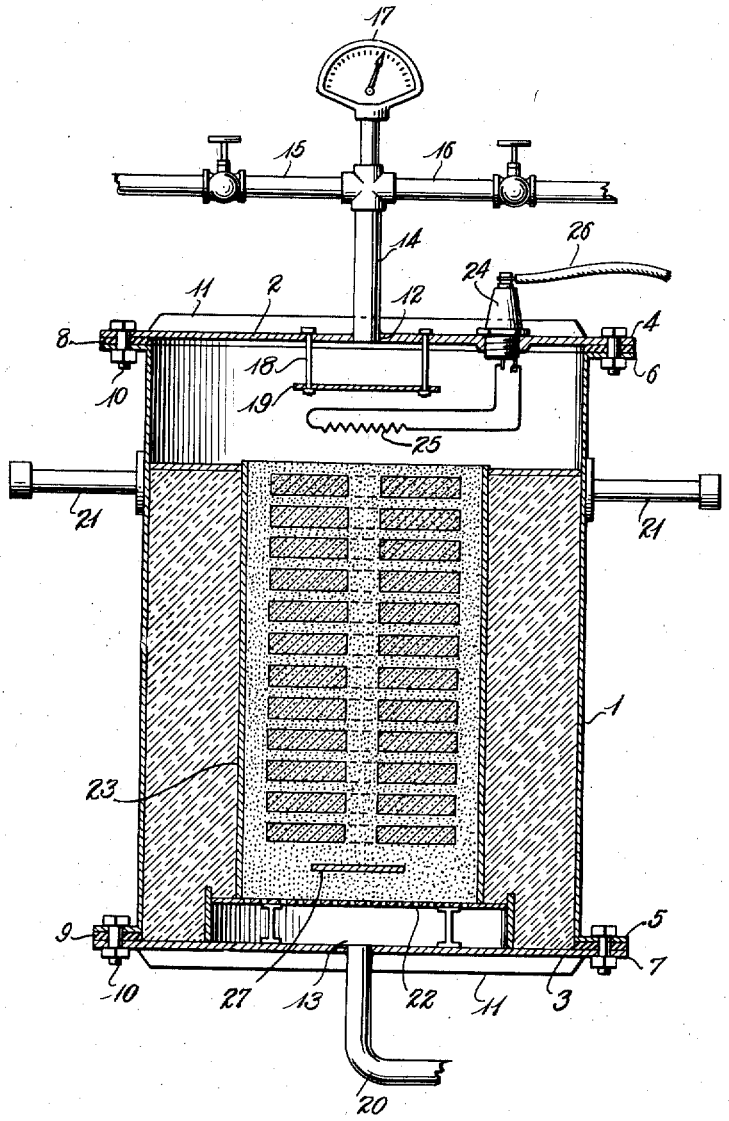
Inventor
Edmund S. Merriam
By James P. Burns
Attorney Reissued Sept. 27, 1938

Re. 20,868

UNITED STATES PATENT OFFICE 20,868

PREFORMED ABRASIVE ARTICLE AND PROCESS OF MAKING SAME

Edmund S. Merriam, Marietta, Ohio

Original No. 2,050,112, dated August 4, 1936, Serial No. 41,003, September 17, 1935. Application for reissue July 28, 1938, Serial No. 221,840

14 Claims. (Cl. 51—278)

This invention relates to preformed abrasive articles and a process for making the same. More particularly the invention contemplates the provision of a novel, efficient, and economic process for producing abrasive wheels of superior quality.

According to current practice, abrasive grinding wheels are composed of grains or grit of hard abrasive material, generally oxide of aluminum or silicon carbide bonded together by a suitable bonding agent. The nature of the bonding material and its quantity determine, to a large extent, the character of the wheel and the uses to which it may be put.

Both organic and inorganic bonding materials are used, the latter, however, being the most common. The usual bonding material comprises a vitrified substance resembling porcelain produced by a controlled process of heating in some form of kiln.

In the manufacture of vitrified abrasive articles, the abrasive grains or grits are mixed with clays of the desired qualities together with feldspar, flint, or like materials and water. The mixture is then formed into the desired shape, such as a wheel, by molding or the like. The wheel is then dried and placed in a kiln. The characteristics of the wheel are controlled to some extent by varying the amount and nature of the bond employed as well as by the subsequent heat treatment.

Both continuous tunnel type and intermittent pottery type kilns are currently employed for the heat treatment of the wheels. In the tunnel type kilns, usually around four days are required to mature and cool the wheels. In the pottery type kilns, it may require as long as three weeks to produce the finished wheel. The use of any kiln is expensive and requires a large investment. The consumption of large amounts of fuel and the time factor in kiln firing are important items in the production costs because of the necessity of retaining for long periods the arches, saggers, walls, and entire kiln at the requisite temperature.

It is the purpose of the present invention to completely obviate the necessity for kiln firing in the production of vitrified abrasive wheels. By the present invention, the great fuel costs incident to the manufacture of vitrified abrasive wheels are reduced to a minimum as are the labor costs and capital investment. Furthermore, the production of my improved abrasive wheel is reduced to a one-day operation.

In accordance with the present invention, the heat necessary to produce the vitrified bond in the wheel is generated in the wheel itself without the application of extraneous heat such as required in kiln firing.

While the invention in its broader aspect comprehends any of many modes of generating the necessary heat to form the vitrified bond in situ in the wheel, my preferred method will be first described. In this method the abrasive grains or grits are mixed with the necessary known ingredients to form the required bond in the finished wheel. With this mixture there is incorporated in uniformly distributed form a combustible material of such character and in such amount as to generate sufficient heat, upon burning, to produce the bond in situ.

The combustible material employed must be such as will not react so vigorously as to cause violent escape of volatile products, and it must not leave any objectionable non-volatile residue in the wheel. I have found petroleum coke or coke produced from coal tar to function very satisfactorily in the process since it produces substantially no ash. Other combustible materials possessing the above defined characteristics are, of course, suitable for use.

Because clays, feldspar, and flint form a heterogeneous system in which reaction may be slow, I prefer to use materials for forming the bond in a prefused or fritted condition so that only a relatively simple fusion is required to be effected in the wheel. I can if desired, of course, add more readily fusible materials, such as borax, cryolite, and the like, to act as a flux.

In order to reach temperatures in the wheel of from 1000° to 1500° C., it is necessary to use only from 4% to 8% by weight of carbon or its equivalent in the wheel when the burning is effected in an atmosphere of oxygen. Slightly more is required when the burning is effected solely through the use of air.

It will, of course, be understood that in preforming the wheel before heat treatment, any of the conventional temporary bonding agents may be employed such as dextrine and Bakelite which burn off completely in the heat treating step.

The character of the final wheel can be accurately controlled, as well as its porosity, by varying the nature and physical structure of the incorporated combustible material. For example, if finely powdered coke is used, the finished wheel will be more dense than when granular coke is used. This is due to the fact that the burning out of the combustible material leaves voids in the wheel comparable in size and number with the individual elements of the combustible material employed. If a wheel of a high degree of porosity is desired, a less dense form of combustible material is used, such for example as charcoal, which is much more bulky than coke, for a given heat development in the wheel. It is possible to use such carbonaceous materials as corn meal, cork particles, and the like. Due to the water produced in their combustion, however, it is preferable to bond the wheel weakly with water glass and then pre-char the woody materials at a low heat. This expedient need be resorted to only in the event that highly porous wheels are desired.

In preparing the mixture which is to form the final vitrified abrasive wheel, the abrasive grains are weighed together with the requisite amount of bonding material in finely divided form. A temporary bonding material is then added and thoroughly mixed with the other ingredients. There is then added a proper percentage, i. e., 4% to 8% by weight, of a selected carbonaceous fuel, usually petroleum coke. It will be understood that the temporary bond simply acts to hold the wheel in shape during the drying and handling operations preparatory to placing it in the retort.

A suitable retort for carrying out the process of the present invention is illustrated in the accompanying drawing.

The retort embraces the outer cylinder 1 of thin metal and the somewhat heavier top 2 and bottom 3. The cylinder 1 carries annular flanges 4 and 5 at the top and bottom, respectively, adapted to cooperate with the peripheral flanges 6 and 7 at the top 2 and bottom 3. A suitable deformable metal washer 8 is clamped between the flanges 4 and 6 at the top, and a similar washer 9 is clamped between the flanges 5 and 7 at the bottom. The bottom 3 may, of course, be permanently united to the cylinder 1. As illustrated, however, both the top 2 and bottom 3 are removable by simply taking out the clamping bolts 10.

The top 2 and bottom 3 are reinforced by angle iron struts 11 welded thereto. The top is provided with a central opening 12 and the bottom with an opening 13. An inlet pipe 14 has a gas-tight fit with the opening 12 and is provided with valve controlled branch lines 15 and 16 for air and oxygen. There is also mounted on the line 14 a suitable pressure gauge 17 for observing the pressure conditions prevailing in the retort. Immediately below the opening 12 in cover 2, there is suspended by rods 18 a baffle member 19 to prevent channeling of the incoming air or oxygen. An outlet pipe 20 for combustion gases and cooling air has a gas-tight fit in the opening 13 in the bottom of the retort. The retort carries trunnions 21 that permit it to be inverted for removal of its charge of treated wheels.

A free circular space having a diameter somewhat greater than that of the wheels to be treated is provided at the bottom immediately above the outlet line 20. This space is between the bottom 3 and the perforated plate or screen 22 suitably supported a few inches above the bottom. An open-ended cylinder 23 having a diameter somewhat greater than that of the wheels to be treated is disposed in concentric relation to the outer cylinder 1. The annular space between the cylinders 1 and 23 is packed with suitable insulating material. A spark plug 24 is fitted into the cover 2, and a coil of readily ignitible thin iron wire 25 is attached to its terminals. The lead 26 extends to any suitable source of electric current such as a 110-volt service line.

In packing a batch of wheels in the retort, a bed of abrasive grains such as used in the wheels or any fine granular material inert at the temperatures employed in the process is filled in at the bottom of the cylinder 23 and supported on the perforated plate 22. A baffle plate 27 may advantageously be set in the bed. The first green wheel containing the requisite amount of combustible material is next laid on the bed and has free granular material filled in around its circumference and in its axial opening. There is then placed over the first wheel a layer of like granular material having mixed therewith coke or other combustible material but no binding agents of any kind. This layer transmits combustion directly from the wheel above to the wheel below, but since it contains no bonding material, the grains remain free after the burning operation, and the layer acts to keep the wheels separated as individual units. The next wheel is then laid in and the operation repeated until the retort is filled. As illustrated, the retort has a capacity of twelve wheels. The top wheel is covered with a layer of grains and admixed coke, and there is also advantageously provided a layer of a suitable readily ignitible substance in immediate proximity to said iron wire coil 25.

When the retort is packed, the cover 2 is affixed in sealed relation thereto and oxygen supplied through the line 15. Suitable means such as a flow meter (not shown) may be provided in the lines 14 and 20 for accurately controlling the rate of flow of air or oxygen through the retort. A switch (not shown) in the spark plug circuit is next closed, which effects ignition in the retort. After ignition has been effected, excess air may be supplied through line 16 in substitution for all or a part of the oxygen being supplied through line 15.

It will be apparent from the arrangement of the wheels and the surrounding packing material that I provide a highly symmetrical retort charge and that the air or oxygen is caused to flow as a confined draft symmetrically through the wheels, insuring uniform burning thereof.

The burning takes place very rapidly and can be controlled by the pressure at which the air or oxygen is supplied and the rate of flow thereof through the retort. Ordinarily burning is complete in from twenty to thirty minutes when substantially pure oxygen is employed. When air is used at the same rate, the time required will obviously be from two to three hours. If time is not a factor, cooling is allowed to occur without acceleration and requires from twenty-four to thirty-six hours. By passing a slow stream of air through the retort, the cooling time can be reduced to around eight hours without deleterious effects.

The current difficulty of non-uniformity of wheels from one run to the next is completely overcome in my process. I need employ no temperature measuring instruments of any kind since, by precise measurement of the fuel introduced to the wheel mix and control of the flow of the gas, a consistently uniform product necessarily results.

It is possible in the molding of the wheels to form on one side thereof a thin layer of grains and admixed coke with a temporary binder only therein. The premolded wheels carrying such layers may then be rapidly placed in the retort and, when burned, the layers are transformed into free unbonded grain layers separating the vitrified abrasive wheels.

In some instances it may be advantageous to include coke in the free grains that are packed around the periphery of the green molded wheels in the retort. This expedient furnishes additional heat and insures complete reaction at the rims of the wheels.

In the production of thin dense wheels, it is sometimes desirable to generate all the heat in the intermediate layers and surrounding grains without the necessity of incorporating the combustible material in the wheel mix.

Having thus described my invention, what I claim is:

1. In a process for manufacturing abrasive articles, the steps of forming a plurality of green abrasive articles containing abrasive grains, reagents adapted upon subjection to adequate heat to form a vitreous bond between said grains, and a combustible material, placing said green articles in a retort and separating the same therein by interposed segregating layers containing a combustion supporting substance, and igniting and burning in said retort said combustible material in said articles and combustion maintaining substance in said segregating layers to thereby generate the requisite heat within the retort to form a vitreous bond between the abrasive grains in said abrasive articles.

2. A process for producing abrasive articles comprising mixing suitable abrasive grains with a vitrifiable bond and a combustible material sufficient in amount, when burned in situ, to generate adequate heat within the article to effect binding of said abrasive grains by said vitrifiable bond, forming the mixture into the desired shape, and igniting and burning said combustible material.

3. A process for producing abrasive articles comprising mixing suitable abrasive grains with a vitrifiable bond, including in the mixture combustible material sufficient in amount, when burned in situ, to generate adequate heat in said article to form a vitreous bond between said abrasive grains, and thereafter igniting and burning said combustible material.

4. A process for producing abrasive articles comprising mixing suitable abrasive grains with a previously fused vitreous binding material in finely divided form, including in the mixture a temporary binder and a substantially non-residue producing combustible material sufficient in amount, when burned in situ, to generate adequate heat in the article to re-fuse said vitreous binding material, forming the mixture into the desired shape, and then igniting and burning said combustible material.

5. A process for producing abrasive articles comprising mixing suitable abrasive grains with vitrifiable reagents adapted upon being subjected to adequate heat to produce a vitreous bond between the abrasive grains, including in the mixture a combustible material sufficient in amount, when burned in situ, to generate adequate heat to cause said vitrifiable reagents to form a vitreous bond, forming the mixture in the desired shape, and then burning said included combustible material.

6. A process for producing abrasive articles comprising mixing suitable abrasive grains with reagents capable, upon being subjected to adequate heat, of reaction and fusion to produce a vitreous bond, including in the mixture a temporary binder and a substantially non-residue producing combustible material sufficient in amount, when burned in situ, to generate adequate heat to effect reaction and fusion of said reagents to form a vitreous bond, forming the mixture into the desired shape, and then burning said combustible material.

7. A process for producing abrasive wheels and the like comprising mixing suitable abrasive grains, a previously fused vitreous bonding material in finely divided form, a temporary binder, and a substantially non-residue producing combustible material sufficient in amount, when burned in situ, to generate adequate heat to again fuse said vitreous bonding material, molding a plurality of green wheels, placing said wheels in a retort with intervening layers of bond-free abrasive grains, and igniting and burning said combustible material.

8. A method for producing abrasive wheels comprising mixing suitable abrasive grains with a vitrifiable bond and combustible material adequate in amount, when burned in situ, to generate sufficient heat to produce from the vitrifiable bond a vitreous bond between said abrasive grains, forming a plurality of temporarily bonded wheels, placing said temporarily bonded wheels in a retort wherein each individual wheel is surrounded by unbonded abrasive grains similar in character to those included in the wheels, and igniting and burning the combustible material in situ in the wheels in said retort to produce a vitreous bond between the abrasive grains in each wheel.

9. In a process for manufacturing abrasive articles, the steps of forming a plurality of green abrasive articles containing abrasive grains, bonding material adapted upon subjection to adequate heat to form a vitreous bond between the grains, and a combustible material, placing said green articles in a retort, segregating the same therein by interposed segregating material, and igniting and burning in said retort said combustible material in said articles by passing combustion-supporting gas symmetrically through said articles to thereby uniformly burn said articles and generate the requisite heat within the retort to form from said bonding material a vitreous bond between the abrasive grains in each of said abrasive articles.

10. A method for producing abrasive wheels comprising mixing suitable abrasive grains with a vitrifiable bond producing material and combustible material adequate in amount, when burned in situ, to generate sufficient heat to produce from the vitrifiable bond producing material a vitreous bond between said abrasive grains, forming a plurality of wheels from such mixture, packing said temporarily bonded wheels in a retort by surrounding each wheel with segregating material, and igniting and burning the combustible material in situ in the wheels in said retort by passing a confined draft of a combustion-supporting gas symmetrically through said wheels to thereby uniformly burn said wheels and produce a vitreous bond between the abrasive grains in each wheel.

11. A process for producing abrasive wheels comprising mixing suitable abrasive grains, a bonding material, a temporary binder, and a combustible material sufficient in amount, when burned in situ, to generate adequate heat to fuse said bonding material, molding a plurality of green wheels, packing said wheels in a retort with intervening layers of segregating material, and igniting and burning said combustible material by effecting a positive flow of a combustion-supporting gas symmetrically through said wheels to uniformly bond the abrasive grains in each wheel.

12. A process for producing preformed abrasive articles comprising initially molding the articles in the desired form from a mixture comprising suitable abrasive grains, bonding material adapted upon being subjected to adequate heat to produce a vitreous bond between the abrasive grains, and a temporary binder, packing the preformed articles in a retort by surrounding each individual article with segregating material so as to provide a symmetrical retort charge, including in said retort charge, in association with each preformed abrasive article therein, combustible material sufficient in amount, when burned in situ, to generate adequate heat to form, from said bonding material, a vitreous bond between the abrasive grains in each article, and burning said combustible material in said retort by effecting a positive flow of combustion-supporting gas through the articles and segregating material in said retort charge.

13. A process for producing preformed abrasive articles comprising initially molding the articles in the desired form from a mixture comprising suitable abrasive grains, bonding material adapted upon being subjected to adequate heat to produce a vitreous bond between the abrasive grains, and a temporary binder, packing the preformed articles in a retort by surrounding each individual article with segregating material so as to provide a symmetrical retort charge, including in said segregating material combustible material sufficient in amount, when burned in situ, to generate adequate heat to form, from said bonding material, a vitreous bond between the abrasive grains in each article, and burning said combustible material in said retort by effecting a positive flow of combustion-supporting gas through the articles and segregating material in said retort charge.

14. A process for producing preformed abrasive articles comprising initially molding the articles in the desired form from a mixture comprising suitable abrasive grains, bonding material adapted upon being subjected to adequate heat to produce a vitreous bond between the abrasive grains, and a temporary binder, superposing a plurality of such preformed articles symmetrically in an insulated enclosure, each of said superposed articles being surrounded by granular material, and each of said superposed articles having combustible material associated therewith in sufficient amount, when burned in situ, to generate adequate heat to form a vitreous bond between the abrasive grains in each article, and burning said combustible material by passing combustion-supporting gas through said superposed articles.

EDMUND S. MERRIAM.